Figures 1, 2:
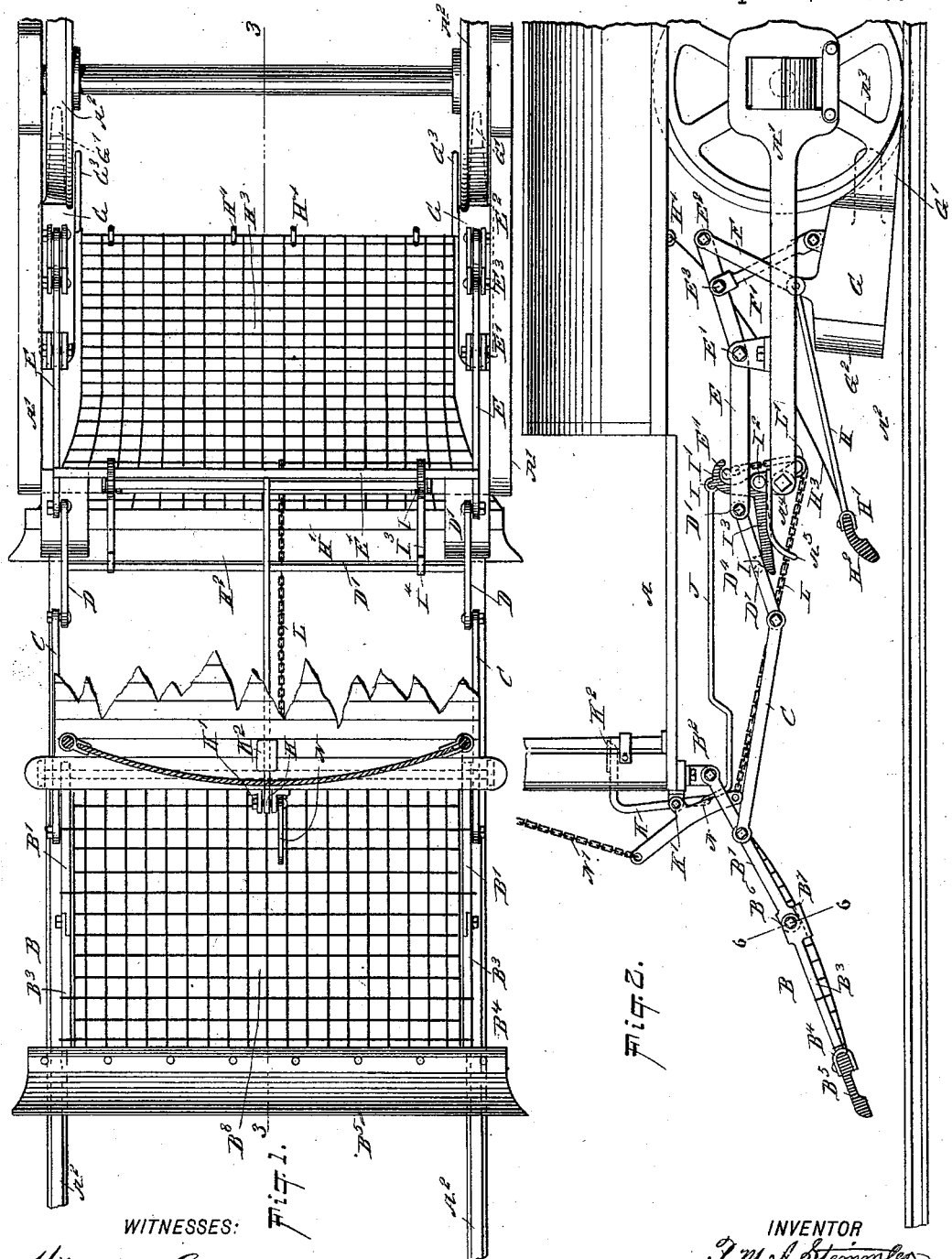

(No Model.) 2 Sheets—Sheet 1.

P. M. A. STEMMLER.
CAR ATTACHMENT.

No. 537,315. Patented Apr. 9, 1895.

WITNESSES:
William Goebel
Theo. G. Hoster

INVENTOR
P. M. A. Stemmler

BY
Munn & Co
ATTORNEYS.

(No Model.) 2 Sheets—Sheet 2.
P. M. A. STEMMLER.
CAR ATTACHMENT.
No. 537,315. Patented Apr. 9, 1895.
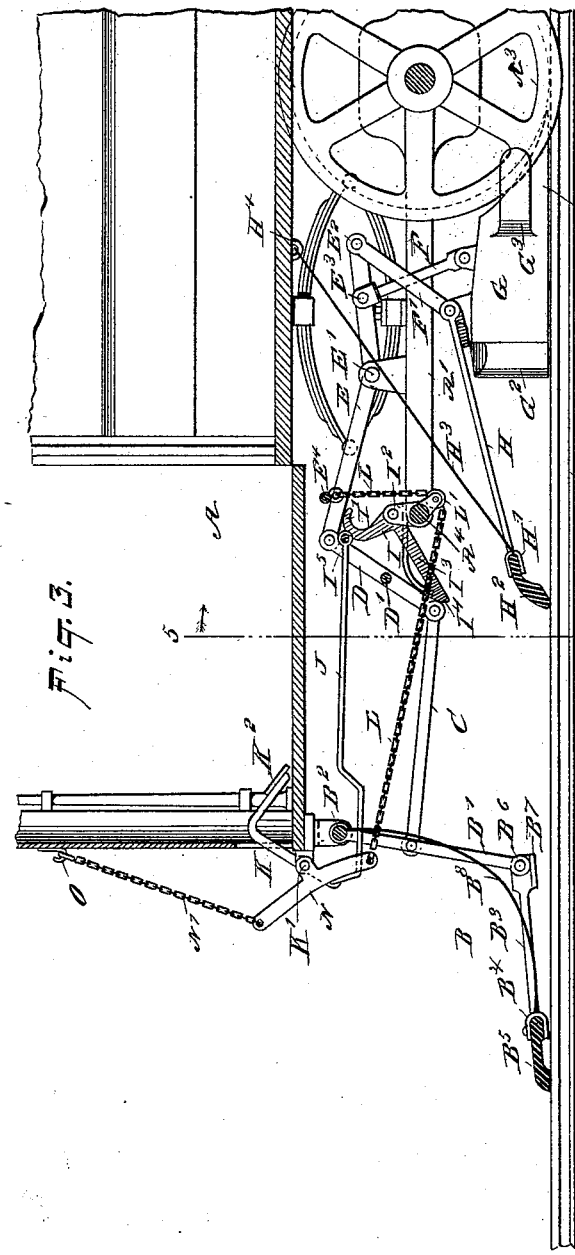
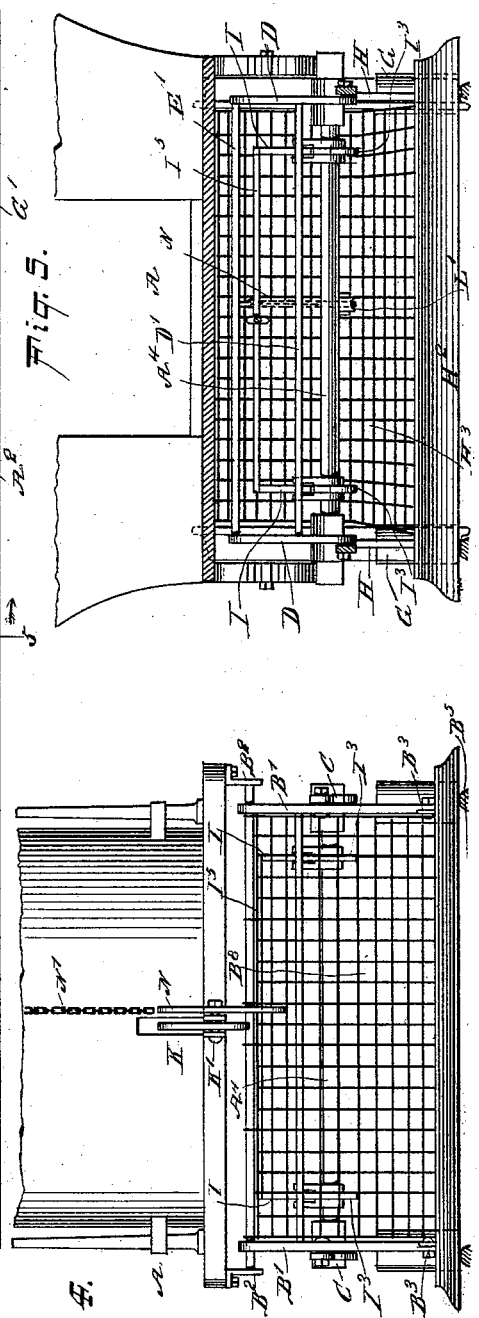
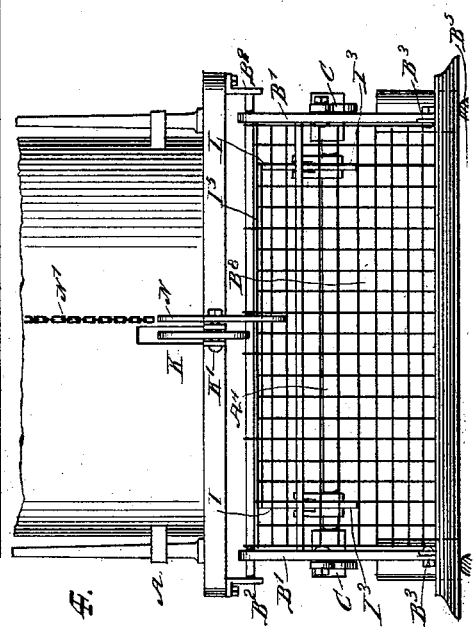
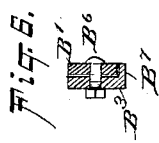
WITNESSES:
William Gaebel
Theo. G. Hoster
INVENTOR
P. M. A. Stemmler
BY Munn & Co
ATTORNEYS.

UNITED STATES PATENT OFFICE.

PAUL M. A. STEMMLER, OF WALDEN, NEW YORK, ASSIGNOR OF ONE-HALF TO CHARLES E. VAN AMBURG, OF SAME PLACE.

CAR ATTACHMENT.

SPECIFICATION forming part of Letters Patent No. 537,315, dated April 9, 1895.

Application filed November 17, 1894. Serial No. 529,136. (No model.)

*To all whom it may concern:*

Be it known that I, PAUL M. A. STEMMLER, of Walden, in the county of Orange and State of New York, have invented a new and Improved Car Attachment, of which the following is a full, clear, and exact description.

The invention relates to fenders and brakes of street railway cars, and its object is to provide a new and improved attachment combining a car fender and an auxiliary brake, arranged in such a manner that the fender and brake are normally in an inactive position until the device is released either by the operator or by an obstruction in the path of the car, so that the fender will move into a position to pick up and retain the obstruction, and at the same time the car will be so strongly braked by the auxiliary brake as to bring the car almost instantly to a standstill.

The invention consists principally of an auxiliary brake mechanism, and a car fender operatively connected with the said brake mechanism so that both are released and move into an active position at the same time.

The invention also consists in certain parts and details, and combinations of the same, as will be hereinafter fully described and then pointed out in the claims.

Reference is to be had to the accompanying drawings, forming a part of this specification, in which similar letters of reference indicate corresponding parts in all the views.

Figure 1 is a plan view of the improvement as applied, and with parts of the car broken out. Fig. 2 is a side elevation of the same. Fig. 3 is a sectional side elevation of the same, on the line 3—3 of Fig. 1, showing the fender and brake in an active position. Fig. 4 is a front view of the same. Fig. 5 is a transverse section of the same, on the line 5—5 of Fig. 3; and Fig. 6 is a transverse section of a fender joint, the section being taken on the line 6—6 of Fig. 2.

On the front end of each platform of the car A, is pivoted or hinged a fender B, formed with the side arms B' pivoted on brackets $B^2$ secured on the under side of the platform of the car, as plainly shown in the drawings. The lower ends of the side arms B' are pivotally connected with another set of side arms $B^3$, rigidly connected with each other at their front ends by a cross bar $B^4$, preferably made U-shape and carrying a strip $B^5$ of flexible material such as rubber, adapted to ride on the rails at the time the fender B is released, and move into an active position as hereinafter more fully described.

The joint $B^6$ between the side arms B' and $B^3$ is a rule joint made in such a manner as to open in but one direction, and for this purpose the side arm $B^3$ is provided with a stopplate $B^7$ adapted to engage the rear end of the side arms B', to hold the said side arms normally in alignment, as indicated in Fig. 2, and to permit the side arms to open rearwardly, as illustrated in Fig. 3. A netting $B^8$ of any approved material is fitted between the side arms, and is attached to the upper end of the side arms B' and the cross bar $B^4$, to permit the side arms B' and $B^3$ to conveniently open and close, as previously explained, and to permit the netting $B^8$ to assume a curved shape at the time the fender is in an active position, as indicated in Fig. 3. The other side arms B' are pivotally connected by links C, with links D standing at angles to the links C, and pivotally connected with the levers E, each fulcrumed at E' on the truck A' of the car A. Each of the levers E on each side of the car is pivotally connected at its rear end at $E^2$ and $E^3$ with levers F and F', respectively, crossing each other and pivotally connected with a brake shoe G, adapted to engage with its under surface the tread of the corresponding rail $A^2$, on which travel the car wheels $A^3$. Each brake shoe G is further provided with a rearwardly extending tongue G', having a curved side adapted to engage the tread of the corresponding car wheel $A^3$, so that when the brake shoe G is moved into an active position it engages with its under surface the rail $A^2$, and with the curved surface of the tongue G' the tread of the wheel $A^3$, so as to form a strong auxiliary brake to bring the car almost instantly to a standstill.

The brake shoe G is preferably provided at its front end with a rubber lining $G^2$, and the said brake shoe may also be provided with a lubricating device for passing a lubricant onto the rails, to readily release the brake shoes after the car is stopped. Each of the brake shoes G is further provided on its inner side with a guide flange G³, extending longitudinally on the inner face of the corresponding car wheel A³.

The brake shoes G are pivotally connected with the forwardly-extending side arms H of a second fender arranged in the rear of the fender B, but in front of the car wheels A³. The side arms H are connected with each other at their forward front ends by a cross bar H', carrying a strip H² of rubber or other flexible material similar to the strip B⁵, and likewise adapted to engage the top of the rails A². A netting H³ is secured at its lower end to the cross bar H', and at its upper end at H⁴ to the under side of the car A, so that when this fender is in an active position at the time the strip H² rests on the rails (see Fig. 3), then the said netting H³ is in a stretched position as shown.

The two side levers E previously mentioned are rigidly connected near their front ends by a cross bar E⁴ adapted to be engaged by one or more hooks I', each formed on a lever I fulcrumed at I² on a cross bar A⁴, forming part of the truck A'. In case two hooks I' are used, as shown, then the said hooks are connected with each other by a cross bar I⁵, pivotally connected by a link J with a foot lever K, fulcrumed at K' on the front end of the platform on the car A, and extending with its upper end through the dashboard, to be engaged at its inner plate K² by the foot of the operator in charge of the car.

Now it will be seen that when the several parts are in the position shown in Fig. 2, then the hooks I' engage the cross bar E⁴ so as to lock the lever E in position, whereby the brake shoes G are held out of engagement with the rails and car wheels A³, and at the same time the links D and C connecting the said lever E with the front fender B, hold the latter in an uppermost position as shown. As the brake shoe G is in an uppermost position, its connection by the side arms H with the rear fender, holds the latter in an inactive position, so that all the parts of the fender and brake are free and clear of the track. When the operator presses the foot lever K, then a forward pull is exerted by the lever K on the link J, so that the hooks I' are swung forwardly and the cross bar E⁴ is released. The weight of the brake shoes G now causes them to swing downward and engage the rails A² and the treads of the wheels A³, and at the same time the swinging of the levers E caused by the downward motion of the brake shoes, acts on the links D and C to swing the front fender B downwardly and rearwardly into an active position. In case however, the operator does not see the obstruction in front of the car in time, and the said obstruction strikes the cross strip B⁵ and bar B⁴ of the front fender B, then the device is also automatically released and put into an active position, and for this purpose the following arrangement is made: The hook levers I are provided with forwardly extending arms I³, each having at its free end a wedge-shaped lug I⁴, adapted to be engaged by a cross bar D' connecting the two links D with each other. Now when the device is in the active position, as shown in Fig. 2, and the obstruction strikes the front fender B, then the latter swings downwardly and rearwardly owing to the joint B⁶ and stop-plate B⁷, so that the link C is pushed rearwardly and the links D caused to swing downwardly, whereby the cross bar D' in contact with the lugs I⁴, causes a downward swinging of the arms I³, so that the hooks I' of the levers I swing out of engagement with the cross bar E⁴, to release the levers E. The above described operation is again repeated, that is, as soon as the levers E are released, the brake shoes G move into a lowermost position, to engage the rails and car wheels A³ to brake the car.

In order to set the device into an inoperative position I provide the following mechanism, which consists in a chain L connected with the cross bar E⁴, to then extend downwardly and pass under a pulley L' supported from the cross bar A⁴ of the car truck A'. The chain L then extends forward to connect with a lever N fulcrumed at K' on the front end of the platform of the car, the upper end of the said lever N being connected with a chain N' adapted to be taken hold of by the operator so that when the latter pulls on the chain, he imparts a swinging motion to the lever N, and the latter in pulling on the chain L draws the levers E downward to the position shown in Fig. 2. The operator then hooks the chain N' onto a hook O secured to the dash-board. (See Fig. 3.) The operator now moves the lever K into its normal position so that the hooks I' are swung over the cross bar E⁴, to lock the levers E in position as previously explained.

Thus it will be seen that by the arrangement described, an operative connection is established between the car fender B and the auxiliary brake mechanism, so that both are moved into an operative position at the same time, the car fender to pick up the obstruction in the path of the car, and the auxiliary brake mechanism to brake the car, to bring the latter to a standstill in a very short time. It will further be seen that the operator in charge of the car can also release the connected fender and brake mechanism whenever he sees an obstruction on the track in front of the car.

Having thus described my invention, I claim as new and desire to secure by Letters Patent—

1. In a car fender, the combination of a fender pivotally connected to the car and adapted to be struck and moved by an obstruction on the track, a movable brake block an auxiliary fender located at the rear of the first named fender and connected with and adapted to be moved by the brake block, and lever mechanism connecting the forward fender with the brake block, substantially as set forth.

2. In a car fender, the combination with a movable fender, a brake block, a lever connected at one end to the brake block and at the other end to the fender and adapted when the fender is moved to actuate the brake block, a hook adapted to engage said lever and hold the brake block out of operative position, and means actuated by the movement of the fender for disengaging the hook from said lever, substantially as described.

3. In a car fender the combination of a movable fender, a brake-block, a lever connected at one end to the brake-block, a link connected at one end to the lever and at the other end to the fender, a hook adapted to engage the lever and hold the brake-block out of operation, said hook having a tail adapted to be engaged by the link, whereby the lever is released, substantially as set forth.

4. In a car fender, the combination of a movable fender, a brake-block, a lever connected at one end to the brake-block and at the other end to the fender, a hook adapted to engage said lever and hold the brake block out of operation, and a platform lever connected to said hook, and adapted when operated to disengage the same from said first named lever, substantially as set forth.

5. In a car fender the combination of a movable fender, a brake-block, a lever connected at one end to the brake-block and at the other end to the fender, a locking device for normally holding said brake block out of operation, means for actuating said locking device to release the brake block, means for applying the brake-block, and means actuated by the movement of the fender for moving said brake block out of operative position, substantially as set forth.

PAUL M. A. STEMMLER.

Witnesses:
SANFORD ABRAMS,
WILLIAM H. DAWSON.